Aug. 12, 1952     E. MATERA ET AL     2,606,481
GEAR CUTTING MACHINE

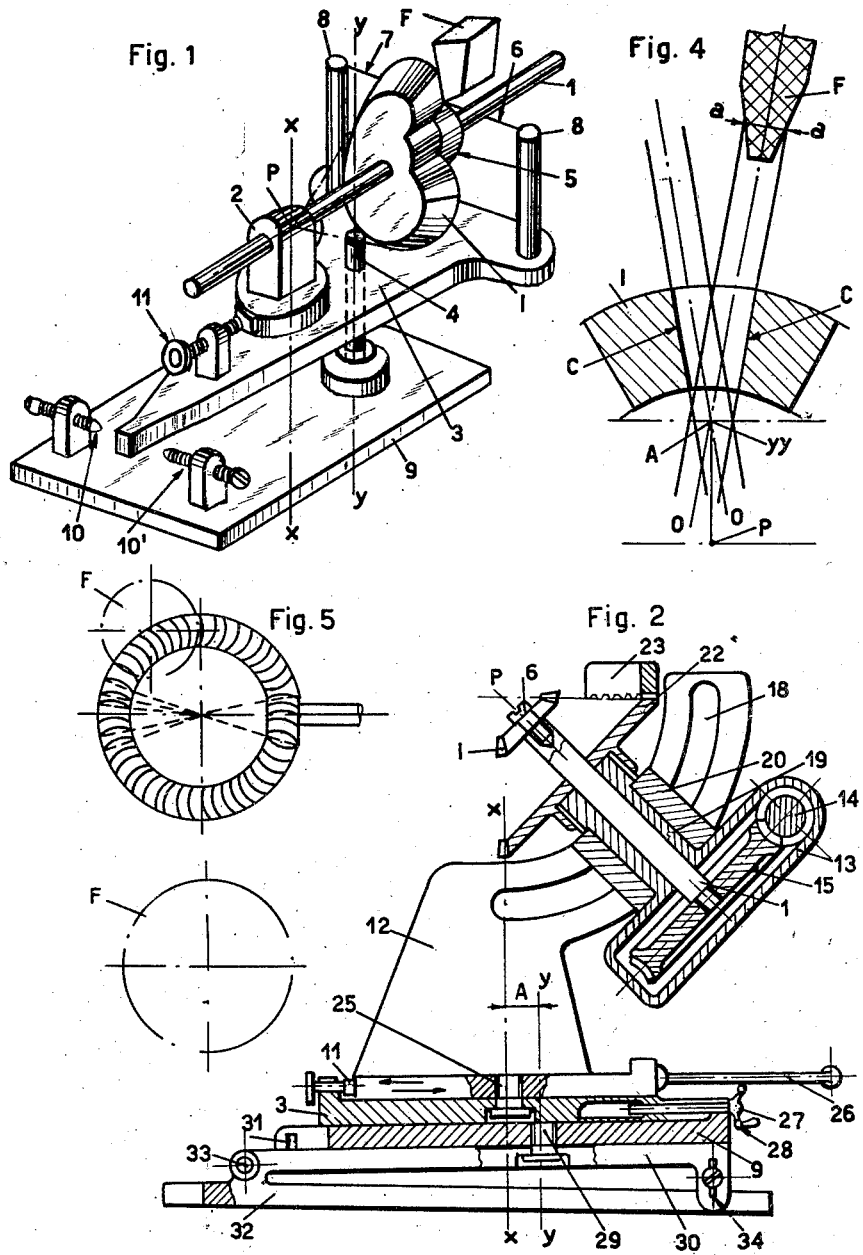

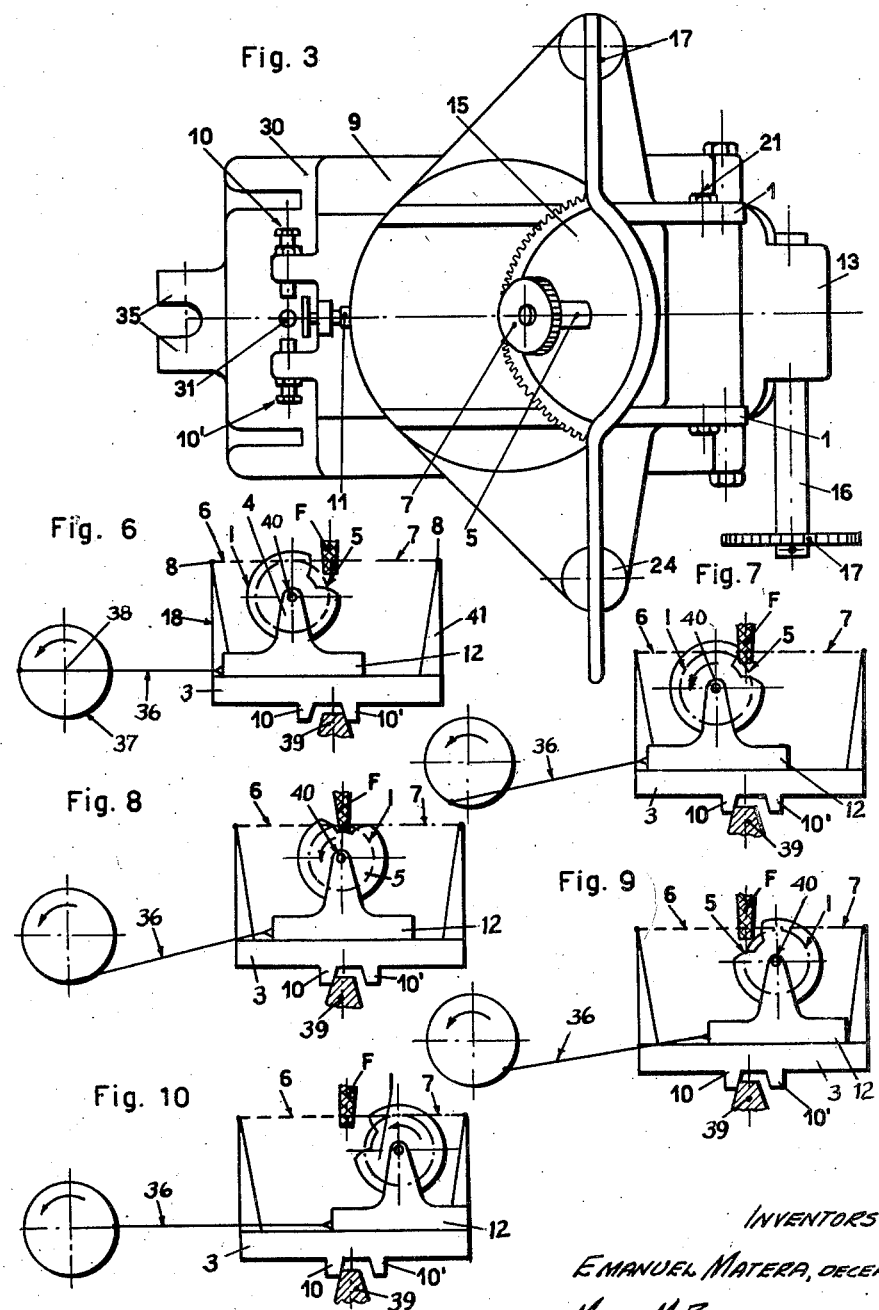

Filed Aug. 2, 1946     3 Sheets-Sheet 3

INVENTORS
EMANUEL MATERA, DECEASED
BY MARIA M. BORGINI, ADMINISTRATRIX
& ETTORE CARETTA
BY: Young, Emery & Thompson
ATTYS.

Patented Aug. 12, 1952

2,606,481

UNITED STATES PATENT OFFICE 2,606,481

GEAR-CUTTING MACHINE

Emanuele Matera, deceased, late of Rivoli, near Turin, Italy, by Maria Matera Borgini, administratrix, Turin, and Ettore Caretta, Turin, Italy Application August 2, 1946, Serial No. 687,932
In Italy May 19, 1942

1 Claim. (Cl. 90—3)

It is known to cut or grind spur or bevel gears by the so-called generating process which consists in generating the teeth of the wheel by means of one or more tools, each of the operating flanks of which matches by its profile the flank of a tooth of an ideal rack or of a crown gear wheel and performs a movement at the main cutting speed, while the work and the ideal rack or crown gear perform a relative movement such as to produce rolling without sliding of the pitch cylinder or cone of the gear to be cut on the pitch plane of the ideal rack or crown gear (generating movement).

It is further known that in the case of straight toothed bevel gears, each operating flank of the tool should be maintained during its cutting and generating movements constantly in the same plane as the vertex of the pitch cone of the gear being cut, coinciding with the center of the ideal crown gear rim, if the teeth to be cut shall duly converge towards the said vertex. In the case of spur gears with straight teeth, the same rule applies when the vertex is considered displaced to the infinite in the direction of the axis.

When bevel gears with teeth having a curvilinear axis are cut, it is desirable that each space between two contiguous teeth conveniently tapers from the larger towards the smaller base so that the strength of the tooth is maintained practically constant along its full axis.

The known machines for cutting or grinding straight toothed bevel gears according to the generating process, cut converging flanks as mentioned above either by the simultaneous use of two tools performing a reciprocating or rotating movement, one of which constantly cuts the left flanks only of the teeth, while the other cuts the right flanks, means being provided for constantly maintaining the operative surfaces of both tools maintained in the same plane as the vertex of the pitch cone of the work, or when one tool only having two operative flanks is employed, for suitably adjusting the work or the tool holder every time operation goes over from a flank or a series of flanks to the opposed flank or series of flanks.

While machines with two tools are always rather complicated, due to the necessity of setting the tools and causing them to perform a converging movement, the machines with one tool only require setting during work, which makes operation lengthy and expensive and accuracy more difficult to obtain.

Even the known machines for cutting toothed wheels with teeth having curvilinear axis according to the generating process, which cut the teeth spaces with decreasing width from the larger towards the smaller base, by using various means implying for instance, in many cases, the use of milling machines with separately attached cutters arranged and operating in various manners, are rather complicated, both on account of the difficulty of adjustment of the tools on the milling machine and complexity of the movements required by cutting by the generating process with these types and arrangements of tools. The complexity of these machines limits the usefulness thereof to production on large series.

This invention relates chiefly to a device for cutting or grinding toothed wheels, more particularly bevel wheels, according to the generating process, by means of one tool only having two operative flanks, in which the cutting or grinding of the facing flanks of each space between two contiguous teeth is obtained by a transverse alternating movement of the work relative to the milling cutter or grinder, each stroke of this movement comprising two stages, namely, correct approach of either flank of the tooth space to either operative flank of the tool performing the main cutting movement, and a generating stage for cutting the flanks of the tooth space according to an involute profile, the said two approaching and generating stages following each other in a continuous and automatic manner so as to alternatively approach and operate upon both contiguous flanks of the same tooth space, when the work is imparted manually or mechanically from the outside one transverse oscillating movement, as the milling cutter or grinding wheel is traversed along the axis of the tooth space.

The requirement of making the tooth flanks duly converge towards the vertex of the pitch cone is met in a particularly simple manner, which enables all the teeth on both flanks to be correctly cut by means of one cutter only without stopping work for effecting adjustment.

This is obtained by mounting the work for rotation about an axis $y$—$y$ (Fig. 1) parallel to axis $x$—$x$ of the ideal crown gear, about which latter axis one of the component movements of the relative generating movement is performed.

The rotation about the axis $y$—$y$ lasts only as long as will be sufficient for alternately bringing correctly each of the facing flanks of one tooth space in front of the corresponding operative flank of the tooth, whereupon said rotation stops and is followed, through the means described and illustrated hereafter, by a rotation about the axis $x$—$x$ such as to produce the generating movement for cutting the tooth flanks by generation.

A further object of this invention is to provide a device for milling or grinding spur gears with straight or helical teeth by the generating process by means of one cutter or grinding wheel having two operative flanks, in which the thickness between the flanks of the cutter or grinding wheel measured on the pitch cone, is smaller than the spacing, likewise measured on the pitch cone, between the two opposite flanks of a tooth space between two contiguous teeth, and in which the flanks to be cut are alternately approached to the tool by a relative translational movement between the tool and work, which ceases as approach has been effected, and is followed, through the arrangement described and illustrated hereafter, by the generating movement.

In this case, the process, which is similar to the one described with reference to the main embodiment of this invention, has the advantage of permitting spur gears to be cut without any adjustment during work, even when, consequent to sharpening, the lateral thickness of the tool is reduced. This is not possible in ordinary methods of cutting spur gears by the generating method.

The device according to this invention, which may be carried out in various forms in order to meet the above-mentioned requirements, may usefully be constructed in the form of an apparatus for association with machine tools, more particularly milling machines, with a view to utilizing said machines also for cutting or grinding gears.

According to this invention, the device may also be carried out in the form of a special machine tool for cutting or grinding gears, in which the two consecutive characteristic movements of correct approach and generation, which in an auxiliary apparatus to be associated with ordinary machine tools are both imparted to the wheel to be cut, may be both imparted to the tool, or to the tool and work, respectively. In either case, the principle of this invention does not vary, inasmuch as the relative movements between the parts are obviously the same.

The invention shall be particularly described with reference to the accompanying drawings which show diagrammatically the devices to be associated with machine tools for cutting bevel and spur gears. The drawings further show a construction of an apparatus for cutting bevel wheels.

Fig. 1 is a diagrammatic perspective view of an apparatus for cutting or grinding bevel gears. The dot and dash lines $y$—$y$ and $x$—$x$ in Fig. 1 show the two axes about which the work successively rotates on each oscillation imparted to it from the outside during the approach and generating stages.

Figs. 2 and 3 are a part axial section and a plane view respectively, of a construction for cutting or grinding bevel gears. This apparatus is used in connection with an ordinary milling or grinding machine.

Fig. 4 is a diagram of the process for the graphic determination of the point through which the axis $y$—$y$ of the movement of approach imparted to the gear to be cut or ground should extend.

Fig. 5 shows by way of example a bevel gear with circular arc teeth, in which the milling cutter or grinding wheel for cutting or grinding the space between two consecutive teeth with a circular arc axis is diagrammatically shown in dash and dot lines.

Figs. 6, 7, 8, 9, 10, 11 and 12 show diagrammatically in successive operating stages during a full cutting or grinding cycle on the tooth space the apparatus for cutting or grinding cylindrical gears.

Figure 11:
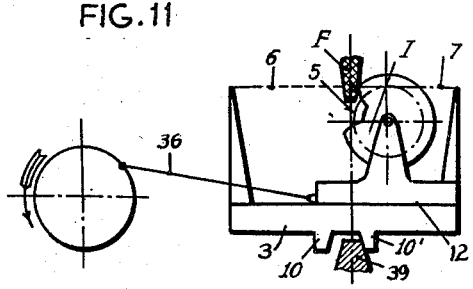

As mentioned above, cutting or grinding are effected by a relative reciprocating movement between the wheel to be cut and the tool, each stroke of this movement comprising two stages which automatically succeed each other. During the first stage (approach), either flank of the space between two consecutive teeth is correctly brought to the tool performing the main cutting movement; during the second generating stage the flank is machined along an involute profile. The approach and generating movements succeed each other during work, and the opposite flanks of one tooth space are alternately acted upon as the milling cutter or grinding wheel advances along the axis of the tooth space and acts on the toothed portion over all its width (feed movement). On completion of one tooth space, the next space comes in front of the tool under the action of an ordinary dividing head.

In cutting bevel wheels, the successive approach and generating movements imparted from the outside to the work, are rotations of which the axes are the previously defined, straight lines $y$—$y$ and $x$—$x$ respectively, the spacing between the latter being determined, for instance, in the manner specified hereafter.

In the case of spur gears, the axes are situated at the infinite, so that relative displacements take place along rectilinear instead of curved directions.

With reference to Fig. 1, which shows the diagram of the apparatus for cutting bevel wheels, I denotes the conical wheel to be cut, which is mounted on a shaft 1 rotating in a support 2 mounted on a pivot for oscillation about the axis $x$—$x$ with respect to plate 3. The latter may oscillate on the pivot 4 about the axis $y$—$y$ with respect to the underlying plate 9. A disc 5 is keyed on the shaft 1 and its circumference is situated on the pitch cone of the bevel gear to be cut, of which the vertex P is situated at the intersection with the axis of the shaft 1. Flexible oppositely wound transmission wires or cables 6 and 7 are anchored at one end to the periphery of the disc 5 and at their other end to points 8 on the plate 3. The plate 9, on which the plate 3 is mounted for oscillation about the pivot 4, is provided with two adjustable stops 10, 10' for the latter, and a brake 11 acts on the pivot having the axis $x$—$x$ and hence on the support 2 of the shaft 1. The diagram shows the tooth F of the milling cutter. By acting in a transverse direction on the shaft 1 the work is imparted an oscillation about axis $y$—$y$ which goes on until a suitable tooth on a plate 3 strikes against either stop 10, 10' said stops being adjustable in such manner that ceasing of the oscillation about the axis $y$—$y$ takes place when either flank of a space between two contiguous teeth has come in front of the tooth in a suitably approached position at the start of cutting by generation. As the work stops against either stop 10, 10', the friction produced by the pressure device 11 is overcome and further oscillation of the shaft 1 produces a rotation about the axis $x$—$x$ which in association with the rolling of the disc 5 on the wires 6 and 7, causes the pitch cone of the work to roll on the plane of the crown gear, as required for the correct generation of either flank of the tooth space.

A construction of the device which has been diagrammatically described above in order to make the characteristic principle of operation better understood, is shown in Figs. 2 and 3. The device comprises a supporting structure 12 carrying the dividing apparatus consisting of a casing 13 having arranged therein the worm screw 14 meshing with the worm wheel 15 which is keyed on the shaft 1 having fixed thereto the wheel I to be cut. The dividing disc 17 (Fig. 3) is keyed externally of the casing 13 on the shaft 16 of the worm screw (Fig. 3). The whole dividing and work-holding device can oscillate about the center of rotation P, which constitutes the vertex of the pitch cone, within suitable part circular grooves 18 cut in the supporting structure 12.

The sleeve 19 (Fig. 2) has fixed thereto the casing 13 of the dividing device and may rotate within the sleeve 20 which is provided with a nut clamping 21 (Fig. 3) for securing the unit in the desired positions. The sleeve 19 carries in turn on the side of the tool F the bevel gear 22 having a pitch cone which is equal in aperture to the wheel to be cut. This interchangeable gear 22 meshes with a sector 23 of a crown gear wheel 23, of which the pitch point coincides with the pitch point P of the work to be cut, and of which the horizontal pitch plane is tangential to the pitch cone of the work. The flanks of the teeth of this crown gear sector 23 converge towards the pitch point P. The above-mentioned crown gear sector is supported by two uprights 24 (Fig. 3) carried by the base of the supporting structure 12. The supporting structure 12 may rock bodily on the base 3 by an angular movement about the pivot 25 of which the axis $x-x$ extends through the pitch point P which is the center of the whole system. This oscillation may be imparted, for example, by a driving mechanism 26.

The base 3 carrying a braking device 11 for the supporting structure 12 may in turn be displaced in the direction of the arrows with respect to plate 9 by means of the screw 27 which is moved by means of the handle 28 within guides in order to displace the pin 25 having the axis $x-x$ with respect to the pivot 29, having the axis $y-y$, of the plate 9, in order to bring the former to its correct relative position to the latter, which position may be determined, for example, by means of the system shown in Fig. 4.

The pivot 29 permits rotation of the plate 9 on the plate 30 which is provided with an abutment (Fig. 2) cooperating with two stops 10, 10' limiting the angular oscillation of the plate. The stops should be adjustable and are therefore in the form of screws. The plate 30 may oscillate with respect to the main base 32 (Fig. 2) of the apparatus about a horizontal pivot 33 and is adjusted at the desired angle by means of the clamping device 34, as it is fixed to the carriage of the milling machine by means of lugs 35.

The circular tool is of a trapezoidal section smaller in width at the pitch cone than the tooth space measured on its minimum width at the pitch cone of the bevel wheel to be cut.

For the graphic determination of the position of the axis $y-y$ with respect to axis $x-x$, the following procedure may be followed:

In a plane passing through the pitch point and containing the intersections of the opposite flanks of two contiguous teeth with the surface of the pitch cone, the angle formed by these intersections CC and having its apex at the pitch point P is considered. The thickness A of the milling cutter or grinding wheel at the pitch cone is further considered, and two lines are drawn, within the angle CPC, parallel to the sides C and spaced therefrom by one half the thickness AA. The intersection A of these parallel lines with each other is the track of the axis $y-y$ about which the movement of approach shall take place. This spacing depends upon the aperture of the pitch cone, the number of teeth of the wheel and the modulus of the set of teeth, the construction just described suggesting the manner of determining the numerical expression as a function of these data.

In Fig. 4 F denotes the miller cutter and I the wheel to be cut.

The apparatus shown in Figs. 2 and 3 is used in the following manner:

Upon adjustment of the divider in order to permit an angular displacement of the wheel to be cut in accordance with the required number of teeth, the toothed wheel 22 having the above specified features is mounted taking care for its correct mesh with the crown segment 23. The wheel I to be cut is then secured on the shaft 1, the relative position of the axis $x-x$ with respect to axis $y-y$ is adjusted by acting on the control 27 and the stop screws 10, 10' are adjusted with respect to the stationary pin 31 (Fig. 3), so that the angle of oscillation of the plate 9 corresponds to the angle CC (Fig. 4) of aperture of the tooth space to be cut, and the braking device 11 is adjusted to overcome the initial moment of oscillation generated by the movement of the control 26. As a last step, the inclination of the whole apparatus is adjusted with respect to the main base 32, so that the plane of the bottom of the tooth of the wheel to be cut is parallel to the direction of the movement of feed of the tool F.

On starting work, the carriage carrying the apparatus is imparted a forward movement and the whole system is at the same time rocked by means of the control 26 about the pivot 29, rotation of the supporting structure 12 on the pivot being prevented by the brake 11, till either the adjusting screw 10 or 10' depending upon the direction of oscillation abuts the pin 31 (Fig. 3). By effect of the continuous effort generated by the control 26 and under the action of the stop mechanism 31—10—10', the resistance opposed by the brake 11 (Fig. 1) is overcome. The supporting structure 12 is free to oscillate about the axis $x-x$ on the crown segment 23 (Fig. 2) and carry along in rotation the sleeve 19, hence the casing 13 with the whole dividing apparatus the internal parts of which are obviously kept blocked during this generating movement, shaft 1 and wheel I fixedly connected thereto, thereby imparting to the latter the correct generating movement with respect to the cutting edge of the milling cuter F, as required for cutting the flank of a tooth by generation.

On reverse oscillation of the control 26 the opposite side is machined and, as the oscillations are repeated on forward movement of the carriage carrying the apparatus, the space between the two opposite flanks is machined with an increasing aperture in accordance with the angle formed by the side cc. Upon completion of two facing flanks of a tooth space the graduated divider disc 17 is acted upon and the work is rotated by one step whereby the next space is brought in front of the tool.

Figure 12:
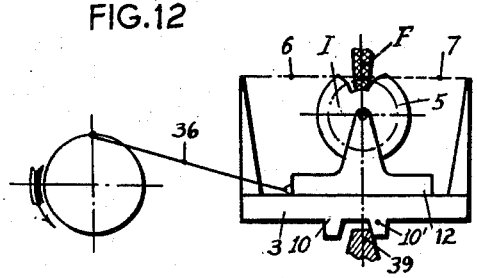

The apparatus for cutting spur gears is shown in Figs. 6 to 12.

The two main component parts of the apparatus are the lower and top plates 9 and 3, respectively. Since spur gears have to be cut, the two axes x—x and y—y are displaced to the infinite in their plane and in the direction of the wheel axis, and the approach and generating movements are mere translational movements produced, for instance, by a crank gear of which the rod is denoted by 36, while 37 denotes the circle described by the crank pin about the pivot 38. The lower plate 3 carries two teeth 10 and 10', respectively, with prismatic internal sides, and the means for adjusting lateral displacements is situated between the teeth, said means consisting of a prismatic tooth 39 which may be moved endwise for effecting adjustment.

By this device it is possible to obtain a most accurate adjustment. The plate 12 is connected with the rod 36 and may slide with respect to the plate 3 under a certain friction adjustable by any means controlling the pressure between the friction surfaces. The plate 3 carries the supports 4 for the wheel I to be cut with spur teeth, mounted on the shaft 40.

The working of the device is plain from examination of Figs. 6 to 12. When the crank mechanism is in the position shown in Fig. 6, the cutter is in the space of the hollow tooth. When this mechanism passes through the position in Fig. 6 to that in Fig. 7, the relative position of the plates 3 and 9 does not alter, and the arresting tooth 15, which was in contact with the tooth 10', comes against the tooth 10 as a result of the lateral movement of the group consisting of the two plates 3 and 9, to which a lateral movement of the wheel to be cut in relation to the cutter F corresponds, at the end of which movement the latter is situated close to the upper extremity of the profile of one flank of the hollow tooth. By the subsequent movement, in the direction of the arrows, of the crank mechanism, on passing from the position shown in Fig. 7 to that shown in Fig. 8, as the plate 9 cannot move any further because it is opposed by the arresting tooth 15, the frictional resistance between the plates 3 and 9 is overcome and the plate 3 moves in relation to the plate 9, as shown in Fig. 8, causing, through the action of the mechanism consisting of the disc 17 and the flexible wires 7 and 6, a rolling movement of the wheel to be cut, whose axle, as it is moved laterally, turns upon itself at the same time, so that the flank of the cutter machines the corresponding flank of the hollow tooth.

A subsequent development of the position according to Fig. 8 to that shown in Fig. 9, brings about a successive rolling of the wheel to be toothed as far as the position shown in Fig. 9, during which the hollow tooth moves laterally in relation to the cutter without the other flank of the hollow tooth being touched. In the movement from the position in Fig. 9 to that in Fig. 10, the first stage of reversal of the transversal movement is beginning and the group consisting of the two plates 3 and 9 moves, without any relative movement of the plates, until the adjustable arresting tooth 15, which was against the tooth 10, happens to be against the tooth 10'. In this position according to Fig. 10, the flank of the cutter comes against the extremity of the other flank of the hollow tooth to be cut. By the subsequent movement from the position in Fig. 10 to that in Fig. 12, the plate 9 will be unable to move further forward for it is retained by the tooth 15 which is striking the tooth 10'. The plate then moves against the frictional resistance, in relation to the plate 9, the wheel to be cut executes a rolling movement opposite to that previously described, and the other flank of the cutter machines the flank of the hollow tooth. By replacing the cutter by a grinding-wheel having the same profile, the grinding of spur gears which have already been cut is achieved by means of the device described above.

According to the variant represented in Fig. 13, which likewise relates to a device for cutting spur gears, the movement of the crank mechanism is not transmitted directly to the supporting plate 3 for the wheel to be cut I, but through a lever 42, to which the crank-arm is connected at 43. The lever 42 oscillates around the point 44 on an upright 41 of plate 3 and, by the aid of a connecting-rod 45, it is connected to the plate 12. In this example, the adjustable stops for the movement of the plate 3 consists of screws 46, 46' carried by parts 47 having fixed thereto the rods 48, 48' to the right and left, respectively. These rods terminate at their free ends by two oppositely directed, that is, a right-handed and a left-handed screw threads, engaging the sleeve 49 having tapped ends, the screw-threads, in the sleeve being right-handed and left-handed, respectively.

On rotating the sleeve 49 by means of a rod fitted into the holes 50, the parts 48, transversely displaceable along the stationary base of the device, are drawn towards or away from each, this effecting adjustment of the first stage of the movement of the blank with respect to the tool, which is the approach movement. Between the plates 12 and 3 is provided the usual friction device.

The working of the device described above is like that previously described but the operation of the cutter is reversed as regards the machining of the flanks of the hollow tooth, more particularly the cutter, which, in the one case, machines the profile of the periphery towards the centre, machines it, in the other, from the centre towards the periphery.

The principle of reversal may also be carried out by the aid of a tool of the type of the plane (alternating movement) instead of a tool of the type of the cutter (rotatory movement) as described above. In this case, no rotative movement, either of oscillation or of rolling, is caused at each cut between the tool and the part to be machined, these movements taking place between one stroke and the other. The tooth is thus machined along its length by a progressive forward movement in depth. This solution can only be realized in special cases by reason of the reduced production capacity which it entails.

It is of course understood that the constructional particulars of the device for cutting or grinding gear wheels, suitable for ordinary milling machines, as well as those of the machine especially intended for carrying out this work, according to the characteristic principle of the invention, may be carried out in any manner, without going beyond the limits of the invention. For example, special independent controls may be provided for each of the two characteristic transversal movements, for example, with the help of cans, hydraulic distributors, etc.

We wish it to be understood that we do not desire to be limited to the exact details of construction shown and described, for obvious modifications will occur to a person skilled in the art.

What we claim is:

A bevel gear shaping device comprising a blank holder in the form of a cylindrical sleeve within which is rotatably mounted a shaft projecting at both ends and having fixed to one end the blank, an exchangeable bevel master gear mounted on the end of said sleeve corresponding to the end of said shaft carrying the blank and having its apex at a point coinciding with the apex of the gear to be cut, a dividing device to index the blank comprising a casing fixed to the end of the sleeve remote from the exchangeable gear, a worm wheel keyed to the corresponding end of said shaft and a worm cooperating with said worm wheel and supported by the casing, a crown gear segment engaging the exchangeable bevel gear and supported by an underlying base, a supporting structure carrying the blank holder by means of two opposite part-circular grooves so that the common axis of the exchangeable gear and of the blank may be adjusted according to the pitch angle of the gear to be cut but constantly passes through the said point, said supporting structure being also supported by the aforenamed underlying base so that it may swivel with respect to the underlying base about a substantially vertical axis extending through the vertex of the gear to be cut, means to impart to said supporting structure an oscillating movement about said axis $x$—$x$, the said base carrying a pivot for the free swivel of the supporting structure about said axis $x$—$x$ and swiveling in turn, together with an underlying plate, about a second axis ($y$—$y$) parallel to said first axis $x$—$x$ with respect to a main base which is orientatably fixed to the slide of a milling machine, means to impart to the supporting structure an oscillating motion in a substantially horizontal plane about the axis $x$—$x$ or $y$—$y$ according to the stage of the movement, frictional means to cause said supporting structure to drag with it in its oscillating motion said base, so as to perform the first stage of the motion or approaching stroke of the blank to the tool, adjusting means producing relative sliding of said base on said underlying plate to conveniently space the axes $x$—$x$ and $y$—$y$, pins and abutments for stopping the transverse stroke of the base as the first stage or approach stroke is accomplished, so that in the second stage the supporting structure continues along its swivel motion about the axis and the non-slip rolling movement of the blank may begin causing the generation of the tooth flanks according to an involute profile.

MARIA MATERA BORGINI,
*Administratrix of the Estate of Manuele Matera, Deceased.*

ETTORE CARETTA.

REFERENCES CITED

The following references are of record in the file of this patent:

UNITED STATES PATENTS

| Number | Name | Date |
| --- | --- | --- |
| 1,479,144 | Lofquist | Jan. 1, 1924 |
| 1,680,258 | Schurr | Aug. 7, 1928 |
| 1,833,993 | Hill | Dec. 1, 1931 |
| 1,925,025 | Amann | Aug. 29, 1933 |
| 1,953,970 | Miller | Apr. 10, 1934 |
| 2,024,747 | Samek | Dec. 17, 1935 |
| 2,258,510 | Laessker | Oct. 7, 1941 |
| 2,364,977 | Hendel | Dec. 12, 1944 |
| 2,372,732 | Norris et al. | Apr. 3, 1945 |
| 2,387,167 | Miller | Oct. 16, 1945 |
| 2,423,286 | Barnes | July 1, 1947 |